United States Patent [19]

Kasenga et al.

[11] Patent Number: 5,378,398
[45] Date of Patent: Jan. 3, 1995

[54] METHOD OF TREATING EUROPIUM ACTIVATED STRONTIUM TETRABORATE PHOSPHOR

[75] Inventors: Anthony F. Kasenga; Joseph J. Lenox, both of Towanda, Pa.; John S. Tulk, Peabody, Mass.

[73] Assignee: GTE Products Corporation, Danvers, Mass.

[21] Appl. No.: 731,179

[22] Filed: Jul. 15, 1991

[51] Int. Cl.$^6$ .............................................. C09K 11/63
[52] U.S. Cl. .............................................. 252/301.40 R
[58] Field of Search .................................. 252/301.4 R

[56] References Cited

U.S. PATENT DOCUMENTS 4,719,033 1/1988 Chenot et al. ............... 252/301.4 R
5,023,015 6/1991 Lagos ............................ 252/301.4 R

*Primary Examiner*—Jack Cooper
*Attorney, Agent, or Firm*—James Theodosopoulos

[57] ABSTRACT

Europium activated strontium tetraborate phosphor is reacted with strontium carbonate or strontium fluoride or ammonium fluoride in order to improve emission characteristics.

6 Claims, No Drawings

METHOD OF TREATING EUROPIUM ACTIVATED STRONTIUM TETRABORATE PHOSPHOR

BACKGROUND OF THE INVENTION

This invention concerns europium activated strontium tetraborate UV emitting phosphors. Such phosphors are disclosed in U.S. Pat. No. 4,719,033.

SUMMARY OF INVENTION

In the process of making europium activated strontium tetraborate phosphor, $SrB_4O_7$:Eu, it occasionally happens that emission characteristics of particular phosphor lots are unsatisfactory. This invention is concerned with the treatment of such unsatisfactory phosphors in order to improve emission output.

In accordance with this invention, the phosphor is blended with strontium carbonate or strontium fluoride or ammonium fluoride and is then fired at an elevated temperature in a reducing atmosphere.

It is believed that the reason for poor emission characteristics in the unsatisfactory phosphors is the presence of a second phase of $SrB_6O_{10}$. X ray diffraction analysis shows the presence Of such a phase in some phosphors having especially poor emission characteristics. It is believed that, because europium is soluble in the $SrB_6O_{10}$ phase, the europium concentration in the $SrB_4O_7$ host is reduced and therefore its UV emission is reduced. Treating the phosphor with $SrCO_3$ or $SrF_2$ or $NH_4F$ converts the $SrB_6O_{10}$ phase to $SrB_4O_7$ and improves emission.

The firing can be done at a temperature of about 1500° to 1800° F. The reducing atmosphere can be hydrogen-nitrogen. When the reactant is $SrCO_3$ or $SrF_2$, at least about 0.4 mole percent should be used in order to improve emission characteristics. When the reactant is $NH_4F$, at least about 5 mole percent should be used.

PREFERRED EMBODIMENT

In a specific example, a $SrB_4O_7$:Eu phosphor, lot number 052-54, had a 100 hour emission in fluorescent lamps of only 94.7% compared with a control.

EXAMPLE 1

971.44 grams of $SrB_4O_7$:Eu from lot 052-54 was blended with 9.45 grams of $SrCO_3$ (1.6 mole %). The blend was fired at 1675° F. for seven hours in 4%, hydrogen-96% nitrogen. The fired cake was broken up and screened. The 100 hour emission of this reacted phosphor had increased to 118.2% compared with the control.

EXAMPLE 2

971.44 grams of $SrB_4O_7$:Eu from lot 052-54 was blended with 8.20 grams of $SrF_2$ (1.6 mole %). The blend was fired at 1675° F. for seven hours in 4% hydrogen-96% nitrogen. The fired cake was broken up and screened. The 100 hour emission of this reacted phosphor had increased to 118.5% compared with the control.

EXAMPLE 3

971.44 grams of $SrB_4O_7$:Eu from lot 052-54 was blended with 18.96 grams of $NH_4F$ (12.8 mole %). The blend was fired at 1675° F. for seven hours in 4% hydrogen-96% nitrogen. The fired cake was broken up and screened. The 100 hour emission of this reacted phosphor had increased to 115.9% compared with the control.

In other examples, reacting lot 052-54 phosphor with 0.4 mole % $SrCO_3$ increased 100 hour emission to 103%. Reacting lot 052-54 phosphor with 0.4 mole % $SrF_2$ increased 100 hour emission to 104.9%.

We claim:

1. The method of treating europium activated strontium tetraborate phosphor comprising the steps of blending the phosphor with strontium carbonate or strontium fluoride or ammonium fluoride, and then firing the blend at an elevated temperature in a reducing atmosphere.

2. The method of claim 1 wherein the elevated temperature is about 1500° to 1800° F.

3. The method of claim 1 wherein the reducing atmosphere is hydrogen-nitrogen.

4. The method of claim 1 wherein the phosphor is blended with at least about 0.4 mole percent $SrCO_3$.

5. The method of claim 1 wherein the phosphor is blended with at least about 0.4 mole percent $SrF_2$.

6. The method of claim 1 wherein the phosphor is blended with at least about 5 mole percent $NH_4F$.

* * * * *